(12) United States Patent
Cheng et al.

(10) Patent No.: US 9,671,764 B2
(45) Date of Patent: Jun. 6, 2017

(54) CONTROL SYSTEM CAPABLE OF PERIODICALLY DRIVING A CORRESPONDING DEVICE BASED ON TRIGGER POLICY AND METHOD THEREOF

(71) Applicant: D-Link Corporation, Taipei (TW)

(72) Inventors: Hsiu-Ju Cheng, Taipei (TW); Ming-Han Liu, Taipei (TW)

(73) Assignee: D-LINK CORPORATION, Taipei (TW)

( * ) Notice: Subject to any disclaimer, the term of this patent is extended or adjusted under 35 U.S.C. 154(b) by 76 days.

(21) Appl. No.: 14/590,231

(22) Filed: Jan. 6, 2015

(65) Prior Publication Data
US 2016/0124398 A1    May 5, 2016

(30) Foreign Application Priority Data
Nov. 3, 2014   (TW) .............................. 103138032 A

(51) Int. Cl.
G05B 11/01         (2006.01)
G05B 15/02         (2006.01)

(52) U.S. Cl.
CPC .............. *G05B 11/01* (2013.01); *G05B 15/02* (2013.01); *G05B 2219/2642* (2013.01)

(58) Field of Classification Search
CPC .................................................... G05B 11/01
USPC .......................................................... 700/12
See application file for complete search history.

(56) References Cited

U.S. PATENT DOCUMENTS

| | | | |
|---|---|---|---|
| 8,615,374 B1 * | 12/2013 | Discenzo | G01D 21/02 219/497 |
| 2008/0012515 A1 * | 1/2008 | Murray | G07C 9/00174 318/466 |
| 2008/0196083 A1 * | 8/2008 | Parks | H04L 67/125 726/1 |
| 2011/0132086 A1 * | 6/2011 | Wang | G01D 11/245 73/431 |
| 2011/0215923 A1 * | 9/2011 | Karim | G08B 25/006 340/540 |
| 2012/0253480 A1 * | 10/2012 | Abe | G08C 17/02 700/12 |
| 2014/0358632 A1 * | 12/2014 | Graff | H04L 12/6418 705/7.29 |

(Continued)

*Primary Examiner* — Robert Fennema
*Assistant Examiner* — Jigneshkumar Patel
(74) *Attorney, Agent, or Firm* — Bacon & Thomas, PLLC

(57) ABSTRACT

The present invention is to provide a control system including a sensing device capable of periodically driving a corresponding operation device based on a trigger policy, wherein the sensing device and the operation device have the same trigger policy stored therein. The control system is characterized in that the trigger policy at least includes a trigger code, a time data (such as "after 15 minutes") and an operation data (such as "turn on a lamp"). When the sensing device detects a sensing signal, the sensing device generates and transmits a trigger instruction to the operation device. When the operation device determines that a trigger code carried in the trigger instruction matches with a second identification code stored therein, the operation device calculates an expiration time of the time data based on the current time, and then executes an action corresponding to the operation data at the expiration time.

6 Claims, 6 Drawing Sheets

(56) References Cited

U.S. PATENT DOCUMENTS

2016/0071386 A1* 3/2016 Mittleman ........... G08B 17/107
340/628

* cited by examiner

CONTROL SYSTEM CAPABLE OF PERIODICALLY DRIVING A CORRESPONDING DEVICE BASED ON TRIGGER POLICY AND METHOD THEREOF

FIELD OF THE INVENTION

The present disclosure generally relates to a control system, more particularly to a control system including a sensing device capable of periodically driving a corresponding operation device based on a trigger policy, such that a user can set corresponding relationship between the sensing device and the operation device according to the user's life habit, and then use the sensing device to detect changes in the environment and drive the operation device to execute a corresponding action (such as "turn on a lamp") in a preset time according to a preset time data (such as "after 15 minutes").

BACKGROUND OF THE INVENTION

Currently, as various portable electronic devices become more popular, people's lifestyles and habits are changed gradually and obviously. Actually, people can handle office routines without staying at office, buy a movie ticket without going to a movie theater, or watch pet at home even if being outdoors. It is obvious that an application area of the portable electronic device is very widely, so the portable electronic device is also called a smart device. In order to make the smart device further go to people's life deeply and dig out more potential market, many device providers further make efforts in integrating the smart device with existing various electrical apparatuses, and expect to establish a comfortable life with a remote control technology concept, and such technology is called "smart family".

In concept of the "smart family", how to control electrical apparatuses at home by a straightforward manner is one of the most important topics. Currently, some device providers design a "real-time simultaneous action" technology, i.e., the electrical apparatuses at home are linked with the local area network or the Internet, and the user can utilize a control device (such as user's personal computer or a cloud server on the Internet) to set at least two electrical apparatuses to be in a simultaneous action status. When the control device determines that one of the at least two electrical apparatuses is driven, the control device controls other of the at least two electrical apparatuses to execute a corresponding action. For example, the television and the air-conditioning are set to be the simultaneous action status, when the user turns on the television, and the control device then controls the air-conditioning simultaneously to be turned on.

The "real-time simultaneous action" technology can simplify user's operation and the user need not control electronic apparatuses one by one. For example, when the user wants to watch movie, the user just need to turn on the television and the control device will automatically turn on the lamp, the air-conditioning and the audio system, and even control the cell phone or computer to enter a mute status. However, such control method still is faultiness. In the traditional real-time simultaneous action technology, an electrical apparatus is triggered simultaneously only when other electrical apparatus is detected to be turned on. For example, after the user returns home, the user may get used to watch television after one hour, and turns on the air-conditioning 20 minutes before watching TV, to adjust indoor temperature; however, the television and the air-conditioning are turned on at different time, so the user can not set the electronic apparatuses in the traditional real-time simultaneous action method.

The inventor finds that there are some control technologies similar to the above-mentioned real-time simultaneous action technology in the market, but their fundamentals are belonged to an infrastructure of determining the status of one of the electrical apparatuses and then driving other of the electrical apparatuses. Currently, no provider introduces concept of time into the control technology to generate more flexible variation in control. Therefore, what is need is to improve the control system of the traditional smart family and blend the time concept into the control flow to enable the user to perform setting and control more conveniently, so as to implement a real smart family.

SUMMARY OF THE INVENTION

The real-time simultaneous action technology of the traditional "smart family" is hard to provide the user to flexibly set the control of each of the electrical apparatuses in advance according to the user's life habit, so the inventor designs a control system periodically driving corresponding device based on the trigger policy, according to long-term practice experience, tests and researches.

An objective of the present disclosure is to provide a control system capable of periodically driving a corresponding device based on a trigger policy. The control system includes a sensing device and at least one operation device. The sensing device is provided with a sensing module, a first connection module, a first processing module and a first storage module. The first processing module is electrically connected with the sensing module, the first connection module and the first storage module respectively. The sensing module can receive or detect a sensing signal. The first storage module stores a first identification code. The operation device is provided with a second connection module, a second processing module and a second storage module. The second processing module is electrically connected with the second connection module and the second storage module respectively, and the second connection module is connected with the first connection module of the sensing device. The second storage module stores a second identification code. The control system is characterized in that first storage module and the second storage module store the same trigger policy, and the trigger policy at least includes a trigger code, a time data (such as "after 15 minutes") and an operation data (such as "turn on a lamp"). When the sensing device detects or receives the sensing signal, the first processing module generates a trigger instruction based on the trigger policy, and transmits the trigger instruction to the second connection module via the first connection module and the second connection module. When the second processing module receives the trigger instruction transmitted from the second connection module, and determines that the trigger code carried in the trigger instruction matches with the second identification code, the second processing module then calculates an expiration time of the time data based on the current time, and then executes an action corresponding to the operation data at the expiration time. Therefore, the user can set corresponding relationship between the sensing device and the operation device according to the user's life habit, and the user just needs to drive the sensing device (or the sensing device detects the change in the environment), the operation device then correspondingly executes the corresponding action in the preset time according to the preset time data, whereby the convenience and intuition in the operation of the control system can be efficiently improved.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
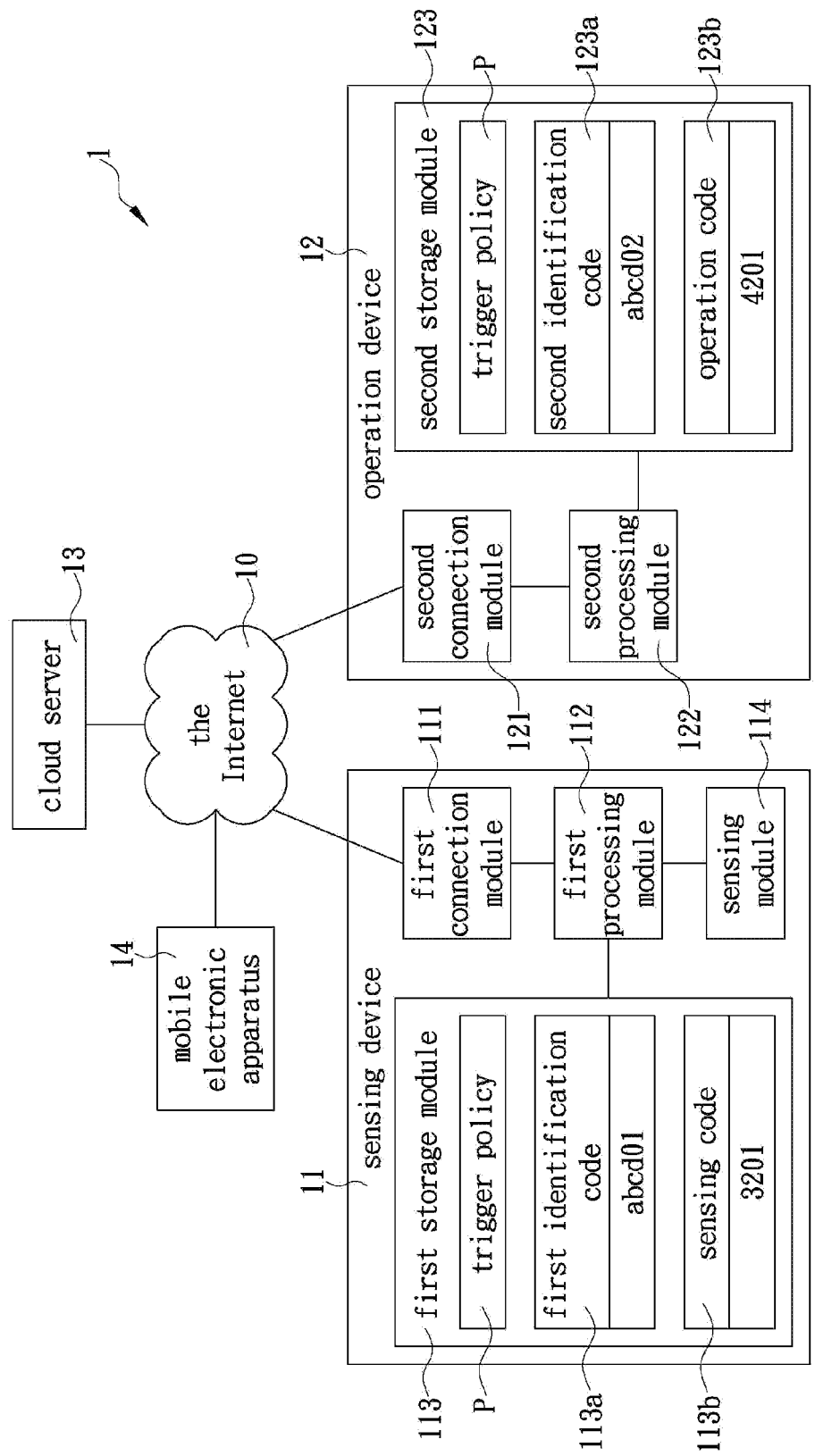
FIG. 1A is a schematic view of a control system of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

The present disclosure illustrates a control system capable of periodically driving a corresponding device based on a trigger policy and a method thereof. Please refer to FIG. 1A which shows a first preferred embodiment of the control system of the present disclosure. The control system 1 includes a sensing device 11 and at least one operation device 12. The sensing device 11 is equipped with a sensing module 114, a first connection module 111, a first processing module can 112 and a first storage module 113. The sensing module 114 is configured for detecting a variation in outside environment (such as image recognition, light sensing, infrared detection, temperature sensing, voice detection, etc.), and generating a sensing signal according to a detection result.

The first processing module 112 is electrically connected with the first connection module 111, the sensing module 114 and the first storage module 113, respectively. The first connection module 111 is linked with the Internet 10 or a local area network directly or indirectly (such as via router). The first storage module 113 stores a first identification code 113a which includes a machine code, a MAC address or an IP address of the sensing device 11.

The operation device 12 can be any electrical apparatus, such as a television, a lamp, an air-conditioning system, an audio system, a smart plug, a smart phone, etc. The operation device 12 is equipped with a second connection module 121, a second processing module 122 and a second storage module 123. The second processing module 122 is electrically connected with the first connection module 111 and the second storage module 123 respectively, and can be linked with the local area network and the Internet 10 to establish link with the first connection module 111 or directly linked with the first connection module 111 by a wireless manner (such as infrared, Bluetooth transmission, etc.).

The second storage module 123 also stores a second identification code 123a which includes the machine code, the MAC address or the IP address of the operation device 12. The control system 1 is characterized in that the first storage module 113 and the second storage module 123 store the same trigger policy P, and the trigger policy P includes a trigger code, time data and operation data. The trigger code corresponds to the second identification code 123a of the operation device 12 and signifies "the electrical apparatus to be triggered". The time data can be a time period, such as a period of 15 minutes, and signify when to drive. The operation data correspond to a clear action instruction, such as "open door" or "flicker light", and signify the action to be executed.

Figure 1B:
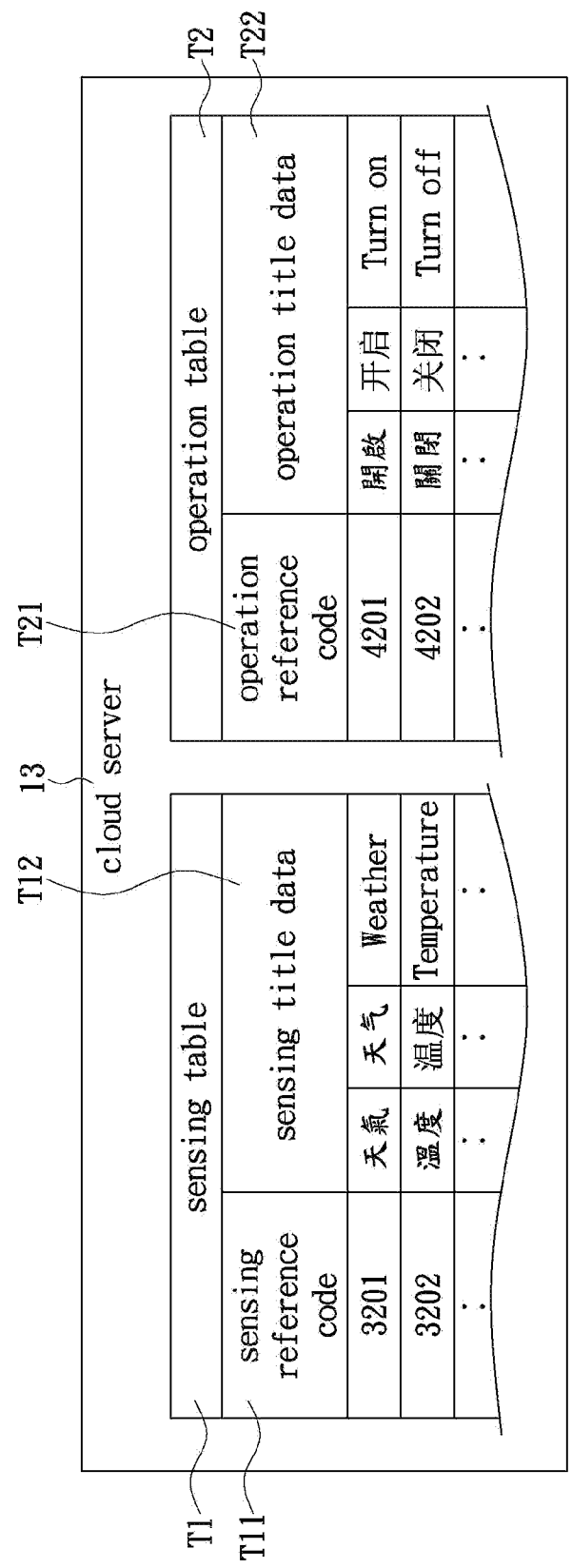
FIG. 1B is a schematic view of a cloud server in the control system of the present disclosure.
Figure 2:
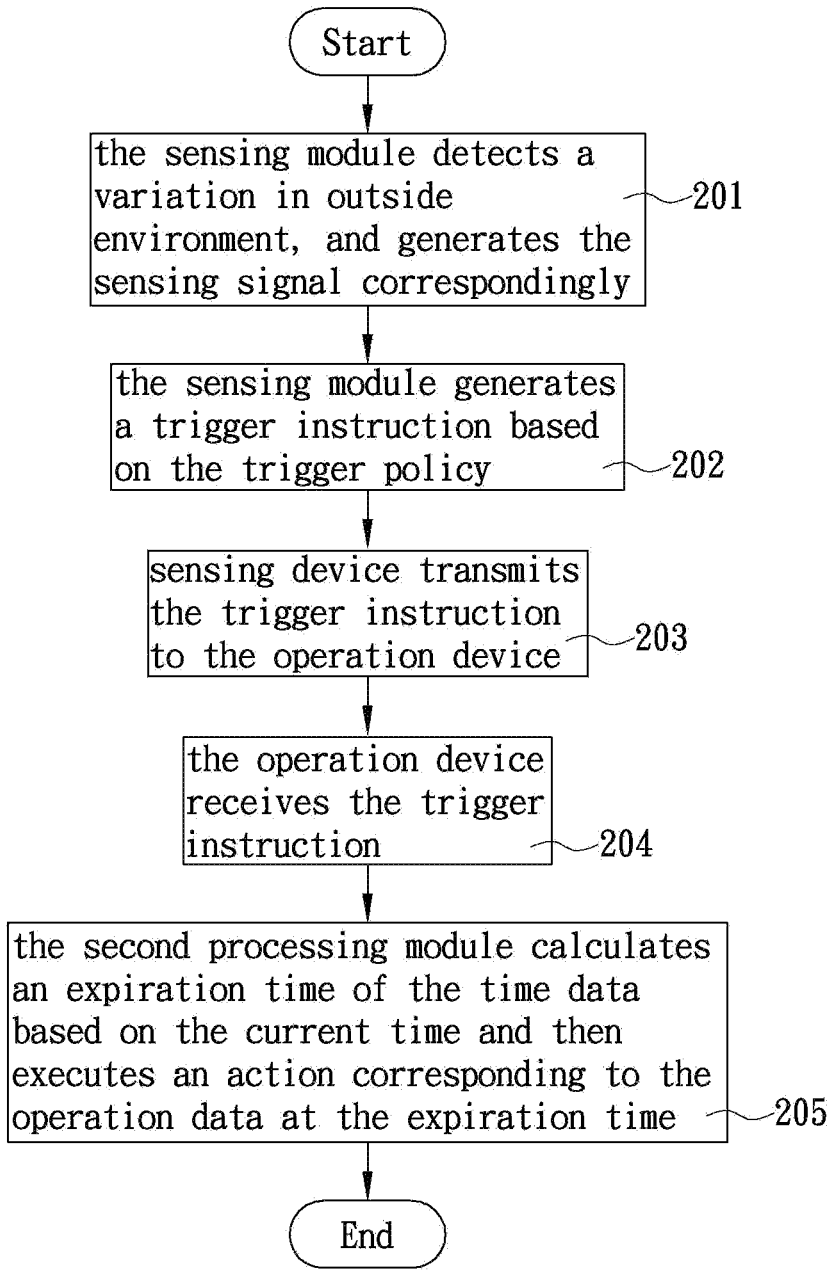
FIG. 2 is a flow diagram of a trigger procedure of the control method of the present disclosure.

Please refer to FIG. 1A through FIG. 2. The steps executed during a trigger procedure of the control system 1 are illustrated in following paragraph.

In step (201), the sensing module 114 detects a variation in outside environment, and generates the sensing signal correspondingly.

In step (202), the sensing module 114 transmits the sensing signal to the first processing module 112, and the first processing module 112 then generates a trigger instruction based on the trigger policy P.

In step (203), the sensing device 11 transmits the trigger instruction to the operation device 12 via the first connection module 111 and the Internet 10.

In step (204), the operation device 12 receives the trigger instruction via the second connection module 121.

In step (205), when the second processing module 122 determines that the trigger code carried in the trigger instruction matches with the second identification code 123a, the second processing module 122 calculates an expiration time of the time data based on the current time and then executes an action corresponding to the operation data at the expiration time.

After the operation device 12 receives the trigger instruction, the operation device 12 further determines whether the current time matches with the time data, and then executes the action corresponding to the operation data when the current time matches with the time data, so that the user can set the trigger policy P with more flexibility. Compared with the real-time simultaneous action technology in prior art, the user's operation can be simplified in the control method of the present disclosure efficiently. For example, if the user's life habit is "after the user returns home, the user goes to the bathroom to take a shower, and then turns on the air-conditioning and goes to the living room to watch TV", according to the real-time simultaneous action technology in prior art, the user only can set the action of turning on the television when the lamp in the living room is turned on; however, according to the technology illustrated in the present disclosure, the user can set a lobby door as the sensing device 11, and set a bathroom lamp, a living room lamp, the air-conditioning and the television as the operation devices 12. When the lobby door is determined to be opened, the actions of turning on the bathroom lamp after 5 minutes, activating the air-conditioning after 15 minutes, turning on the living room lamp after 30 minutes, and turning on the television after 35 minutes are triggered automatically. A series of actions can be integrated in the single trigger policy P, so as to enable the user to build a unique smart family technology in the concept of timeline based on the user's life habit.

In this exemplary embodiment, the second processing module 122 is provided with a timer inside, so that the second processing module 122 can calculate a time difference between a time point of receiving the trigger instruction and the current time after receiving the trigger instruction, and then determine whether the time difference matches with the time data. However, the timing manner applied in the operation device 12 is not limited to the timer. The operation device 12 can also be linked with the Internet 10 to acquire network time data from a third party server for use as the current time, and then determine whether the current time matches with the time data.

Apart from enabling the user to set the electrical apparatuses more flexibly according to the concept of timeline, the control system 1 and the control method of the present disclosure further has advantages of high stability and succinct technology. Because the trigger policy P is stored in the sensing device 11 and the operation device 12 respectively, this scheme is different from the traditional real-time simultaneous action technology in which the simultaneous action relationship is stored in a cloud server. Therefore, the sensing device 11 and the operation device 12 can be connected with each other (such as via local area network) to normally process the trigger procedure even if the sensing device 11 or the operation device 12 cannot be linked with the Internet 10, In addition, the trigger policy P is stored in the sensing device 11 and the operation device 12 both, so the trigger instruction transmitted by the sensing device 11 can just contain simple trigger code without the detailed operation command.

Figure 3:
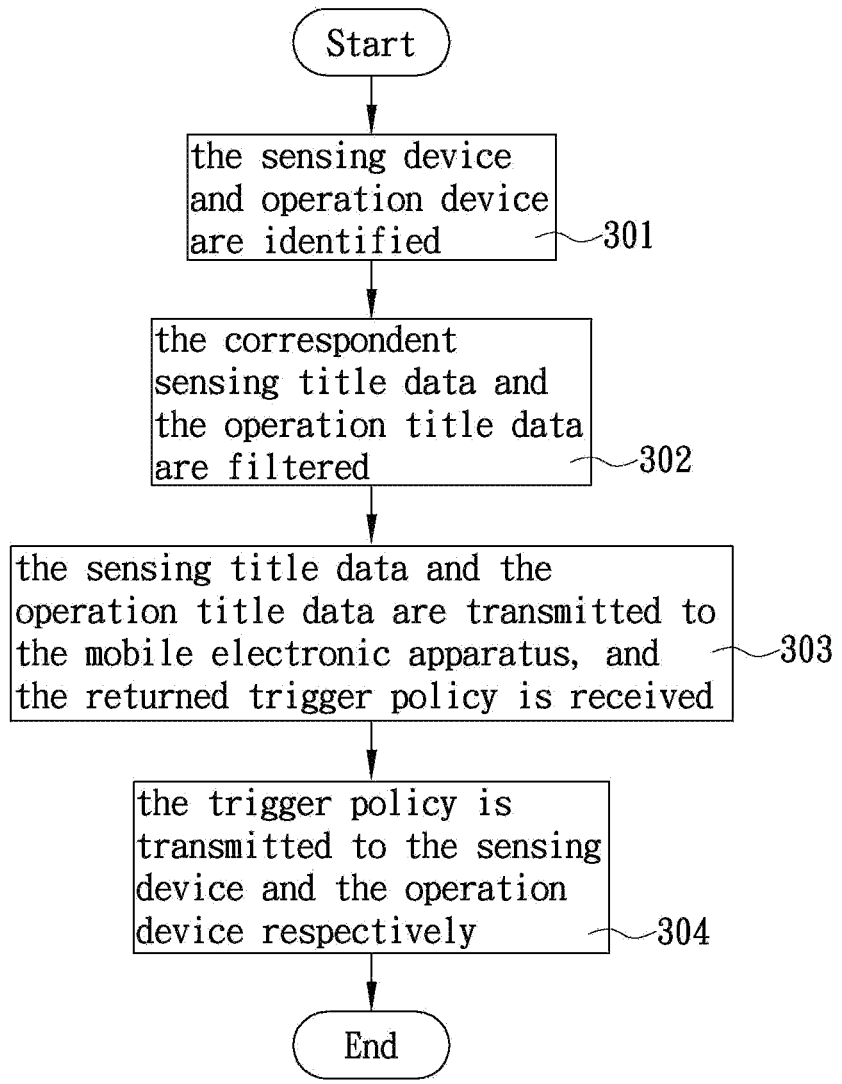
FIG. 3 is a flow diagram of a setting procedure of the control method of the present disclosure.

Please refer to FIG. 1A, FIG. 1B and FIG. 3. In this exemplary embodiment, the control system 1 further includes a cloud server 13 which stores a sensing table T1 and an operation table T2. The sensing table T1 includes at least one sensing reference code T11 and at least one sensing title data T12 (such as temperature detection, weather detection, or image detection). The sensing title data T12 correspond to the sensing reference codes T11 respectively. The operation table T2 includes at least one operation reference code T21 and at least one operation title data T22 (such as action of turning on, turning off, flickering or warning), and the operation title data T22 correspond to the operation reference codes T21 respectively. The first storage module 113 of the sensing device 11 stores a sensing code 113b, the second storage module 123 of the operation device 12 stores an operation code 123b, and the sensing code 113b and the operation code are inputted by the device provider based on the inner hardware configuration during the manufacturing processes of the sensing device 11 and the operation device 12.

Before the trigger procedure is executed, the control system 1 can generate the trigger policy P by a setting procedure. After the user operates a smart phone to link with the sensing device 11 or the operation device 12, the user can input and set the trigger policy P. The setting manner can be designed or adjusted by the device provider. However, in the first preferred embodiment of the present disclosure, the setting procedure includes following steps which are executed by the cloud server 13 after the cloud server 13 and a mobile electronic apparatus 14 (such as user's smart phone) are linked with each other.

In step (301), via the Internet 10, the sensing device 11 and operation device 12 are identified according to the first identification code 113a and the second identification code 123a. In this exemplary embodiment, the cloud server 13 can check the attributes of the sensing device 11 and the operation device 12 based on the sensing code 113b and the operation code 123b (i.e. an electrical apparatus is identified to be belonged to sensing side or triggering side).

In step (302), the sensing table T1 and the operation table T2 are filtered to obtain the sensing reference code T11 and the operation reference code T21 equal to the sensing code 113b and the operation code 123b, and the sensing title data T12 and the operation title data T22 corresponding to the filtered sensing reference code T11 and the operation reference code T21.

In step (303), the sensing title data T12 and the operation title data T22 obtained in step (302) are transmitted to the mobile electronic apparatus 14, after the user sets and generates the trigger policy P based on the sensing title data T12 and the operation title data T22, the cloud server 13 receives the trigger policy P returned from the mobile electronic apparatus 14.

In step (304), the trigger policy P is transmitted to the sensing device 11 and the operation device 12 respectively, to enable the sensing device 11 and the operation device 12 to process the subsequent trigger procedure based on the trigger policy P.

As shown in FIG. 1A and FIG. 1B, the operation title data T22 for the same operation reference code T21 correspond to different language respectively, for example, "開啓", "开启", and "turn on" correspond to traditional Chinese, simplified Chinese and English. During the setting procedure, the cloud server 13 can determine a language used in the mobile electronic apparatus 14 (for example, the cloud server 13 can transmit a test signal or an inquiring signal to the mobile electronic apparatus 14 and then determine the language according to a reply from the mobile electronic apparatus 14), and just transmit the operation title data T22 corresponding to the used language to the mobile electronic apparatus 14. Similarly, the sensing table T1 can be formed by sensing title data T12 in different languages.

In this exemplary embodiment, the user can operate an application installed in the mobile electronic apparatus 14 (such as APP installed in the smart phone) to set the trigger policy P, and the sensing table T1 and the operation table T2 can be augmented or adjusted according to a number of types of products manufactured by the provider, i.e. when the user wants to set the trigger policy P, the mobile electronic apparatus 14 starts to obtain the sensing table T1 and the operation table T2 from the cloud server 13. Therefore, the device provider need not update the application frequently even if the device provider manufactures more kinds of the electrical apparatuses according to variation of the market and the sensing table T1 and the operation table T2 are updated repeatedly. The sensing device 11 and the operation device 12 need not be linked with the cloud server 13 periodically for updating the program. Accordingly, apart from efficiently simplifying the user's management for the sensing device 11 and the operation device 12, the control system of the present disclosure can further efficiently reduce the provider's cost in development and verification, and prevent the device provider from high expenses in verification and inspection for each update of the application.

In addition, in the above-mentioned embodiment, the sensing device 11 detects the variation in outside environment and generates the sensing signal. However, in practical implementation, the sensing device 11 can also receive a signal transmitted from the remote for use as the sensing signal (for example, the user transmits an instruction via a smart phone, or the cloud server 13 periodically transmits the signal in a predetermined time), and the subsequent trigger procedure is executed according to such sensing signal.

Figure 4A:
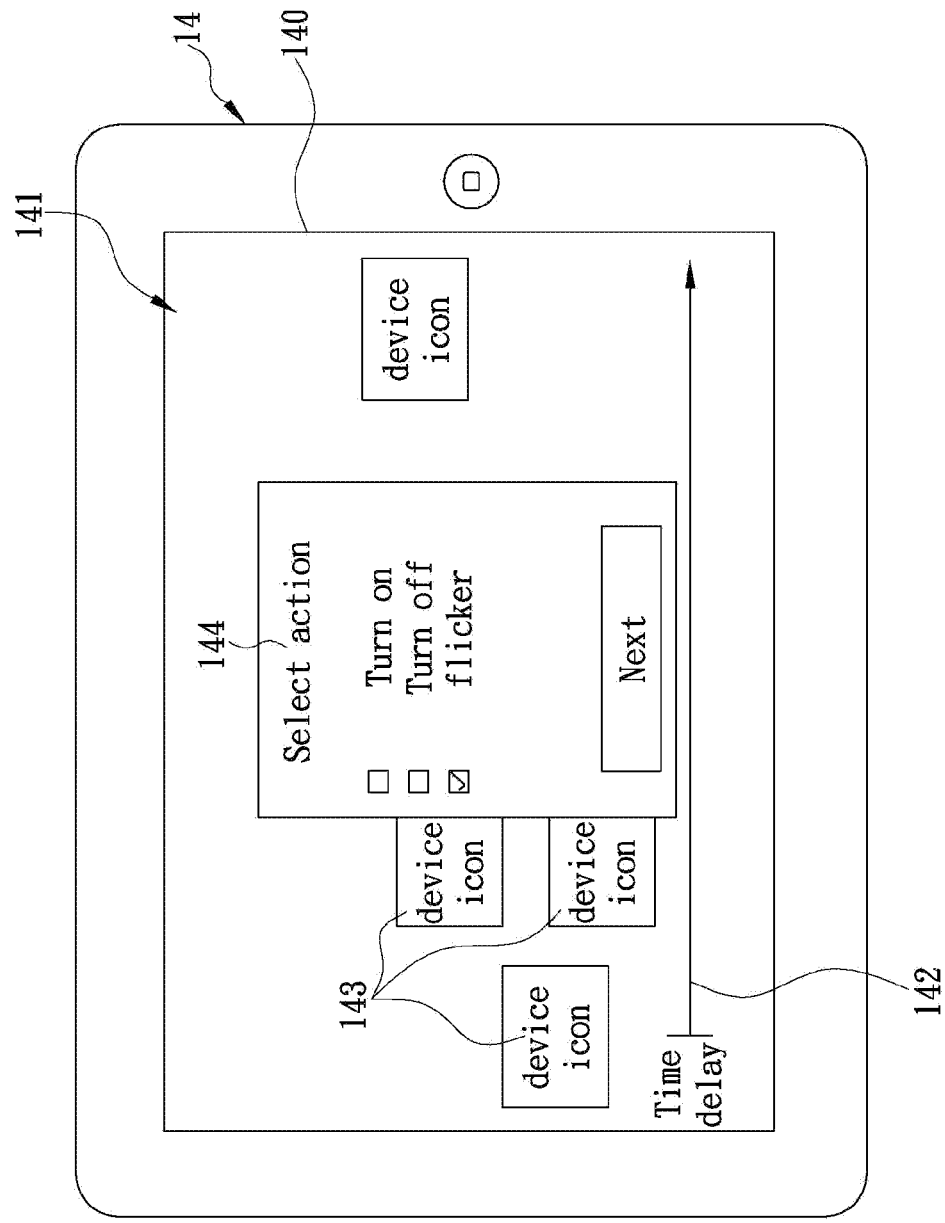
FIG. 4A is a schematic view of a setting interface generate by the control system of the present disclosure.
Figure 4B:
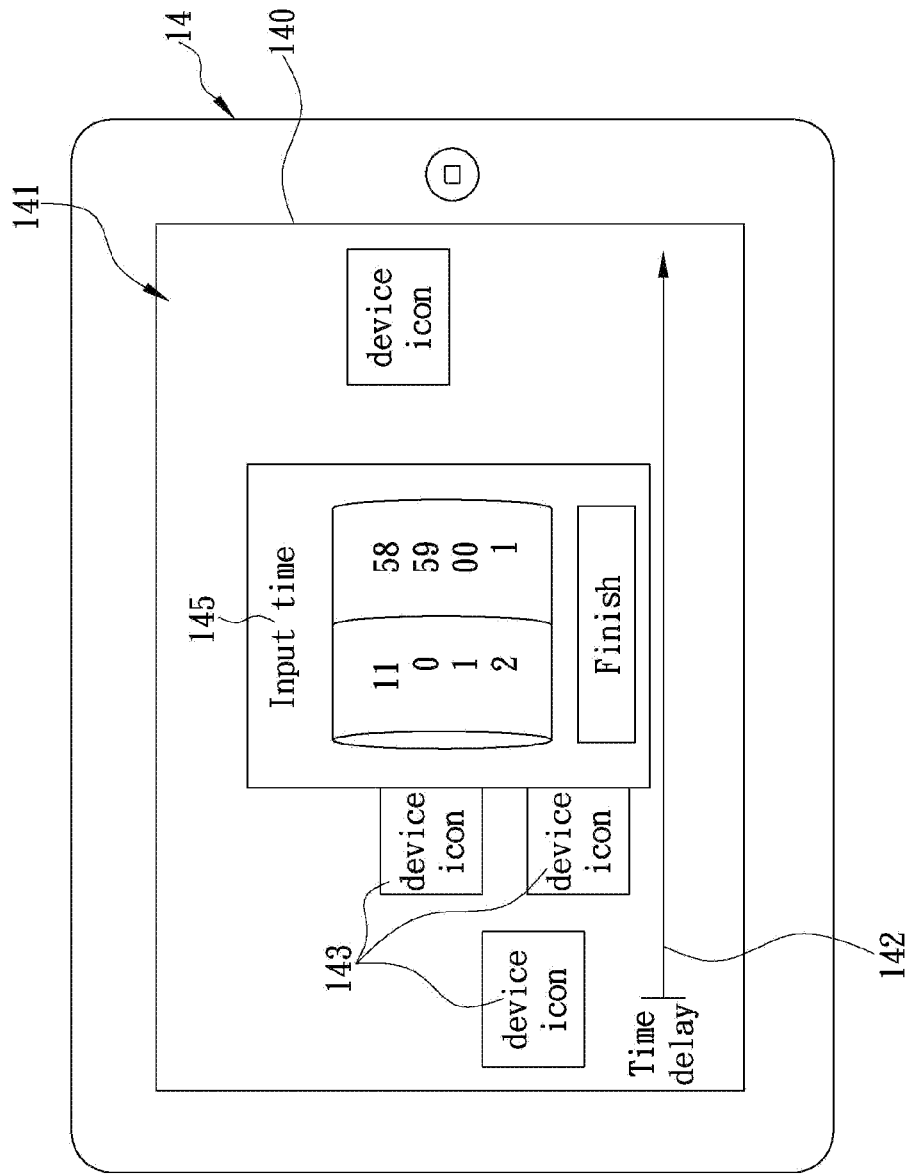
FIG. 4B is another schematic view of the setting interface generated by the control system of the present disclosure.

Please refer to FIG. 4A and FIG. 4B together with the FIG. 1A, FIG. 1B. In the setting procedure, after the cloud server 13 transmits the sensing title data T12 and the operation title data T22 to the mobile electronic apparatus 14, the mobile electronic apparatus 14 can display a setting screen 141 on a display screen 140 thereof. The setting screen 141 includes a timeline 142 and a plurality of device icons 143. Each of the device icons 143 corresponds to the sensing device 11 or the operation device 12. When the user clicks the device icon 143, the mobile electronic apparatus 14 shows the sensing title data T12 (such as "rain detection", "detected temperature higher than 30° C.") or the operation title data T22 (such as the screen shown in FIG. 4A) in a first list screen 144 to provide the user to select and set the operation data.

After the user selects the corresponding sensing title data T12 or the operation title data T22, the mobile electronic apparatus 14 further generates a second list screen 145 which is a time setting screen for providing the user to set time data. The mobile electronic apparatus 14 integrates the set operation data and the time data as the trigger policy P, and then transmits the trigger policy P to the cloud server 13. The trigger policy P is then stored in the sensing device 11 and the operation device 12 respectively.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A control system capable of periodically driving a corresponding device based on a trigger policy, comprising:
   a sensing device equipped with a sensing module, a first connection module, a first processing module and a first storage module, wherein the first processing module is electrically connected with the sensing module, the first connection module and the first storage module, respectively, the sensing module can receive or detect a sensing signal, and a first identification code and a trigger policy are stored in the first storage module;
   at least one operation device each equipped with a second connection module, a second processing module and a second storage module, wherein the second processing module is electrically connected with the second connection module and the second storage module, respectively, the second connection module is connected with the first connection module through the Internet, and a second identification code and the same trigger policy are stored in the second storage module; and
   a cloud server linked with the first connection module and the second connection module respectively through Internet and transmitting the trigger policy to the sensing device and the operation device respectively, wherein the trigger policy at least comprises a trigger code, a time data and an operation data and, when the sensing device receives or detects the sensing signal, the first processing module generates a trigger instruction according to the trigger policy, and transmits the trigger instruction to the second processing module sequentially via the first connection module, the Internet and the second connection module;
   whereby, when the second processing module determines that the trigger code carried in the trigger instruction matches with the second identification code, the second processing module calculates an expiration time of the time data based on the current time and then executes an action corresponding to the operation data at the expiration time.

2. The control system as defined in claim 1, wherein the first storage module further stores at least one sensing code, the second storage module stores at least one operation code, and the cloud server at least stores:
   a sensing table at least storing a sensing reference code and a sensing title data, each of the sensing title data corresponding to the sensing reference code; and
   an operation table storing an operation reference code and an operation title data, the operation title data corresponding to the operation reference code respectively;
   wherein, in a condition that a mobile electronic apparatus is linked with the cloud server, the cloud server identifies the sensing device and the operation device first, and then receives the sensing code and the operation code transmitted from the sensing device and the operation device respectively;
   wherein the cloud server filters the sensing code and the operation code corresponding to the sensing reference code, the operation reference code, the sensing title data and the operation title data, and transmits the sensing title data and the operation title data to the mobile electronic apparatus, whereby the sensing title and the operation title can be displayed on the mobile electronic apparatus and the cloud server can receive the trigger policy generated and returned from the mobile electronic apparatus.

3. The control system as defined in claim 2, wherein the sensing title data or the operation title data correspond to different languages respectively, and the cloud server can identify a language used in the mobile electronic apparatus, and transmits the sensing title data or the operation title data corresponding to the language to the mobile electronic apparatus.

4. A control method of periodically driving a corresponding device based on a trigger policy, applied on a control system which comprises a sensing device, at least one operation device and a cloud server, wherein the sensing device is configured for receiving or detecting a sensing signal and storing a first identification code and the trigger policy therein, the trigger policy at least comprises a trigger code, a time data and an operation data the operation device is linked with the sensing device through the Internet and stores a second identification code and the trigger policy therein, and the cloud server is linked with the sensing device and the operation device respectively through the Internet and transmits the trigger policy to the sensing device and the operation device respectively; the control method enabling the control system to execute a trigger procedure and comprising steps of:

enabling the cloud server to identify the sensing device and the operation device based on the first identification code and the second identification code and then transmit the trigger policy to the sensing device and the operation device respectively via the Internet;

enabling the sensing device to generate a trigger instruction based on the trigger policy in a condition that the sensing device receives or detects the sensing signal, and then transmit the trigger instruction to the operation device through Internet; and enabling the operation device to calculate an expiration time of the time data based on the current time, and then execute an action corresponding to the operation data at the expiration time in a condition that the operation device determines the trigger code carried in the trigger instruction matching with the second identification code.

5. The control method as defined in claim 4, wherein the first storage module stores at least one sensing code, the second storage module stores at least one operation code, the cloud server stores a sensing table and an operation table, the sensing table at least stores a sensing reference code and a sensing title data, the operation table at least stores an operation reference code and an operation title data, wherein when the cloud server identifies the sensing device and the operation device, and is linked with a mobile electronic apparatus via the Internet, the cloud server further executes following steps of:

receiving the sensing code and the operation code transmitted from the sensing device and the operation device respectively;

filtering the sensing reference code and the operation reference code equal to the sensing code and the operation code respectively, from the sensing table and the operation table;

transmitting corresponding sensing title data and operation title data to the mobile electronic apparatus, and then receiving the trigger policy generated and returned from the mobile electronic apparatus; and transmitting the trigger policy to the sensing device and the operation device respectively.

6. The control method as defined in claim 5, wherein the sensing title data or the operation title data correspond to different languages respectively, and after the cloud server receives the sensing code and the operation code transmitted from the sensing device and the operation device, the cloud server further executes following steps of:

identifying a language used in the mobile electronic apparatus; and filtering the sensing title data or the operation title data corresponding to the language.

\* \* \* \* \*